C. E. R. SCHNEIDER.
APPARATUS FOR SHOWING PICTURES IN RELIEF.
APPLICATION FILED JULY 29, 1920.
Reissued Nov. 9, 1920. 14,980.
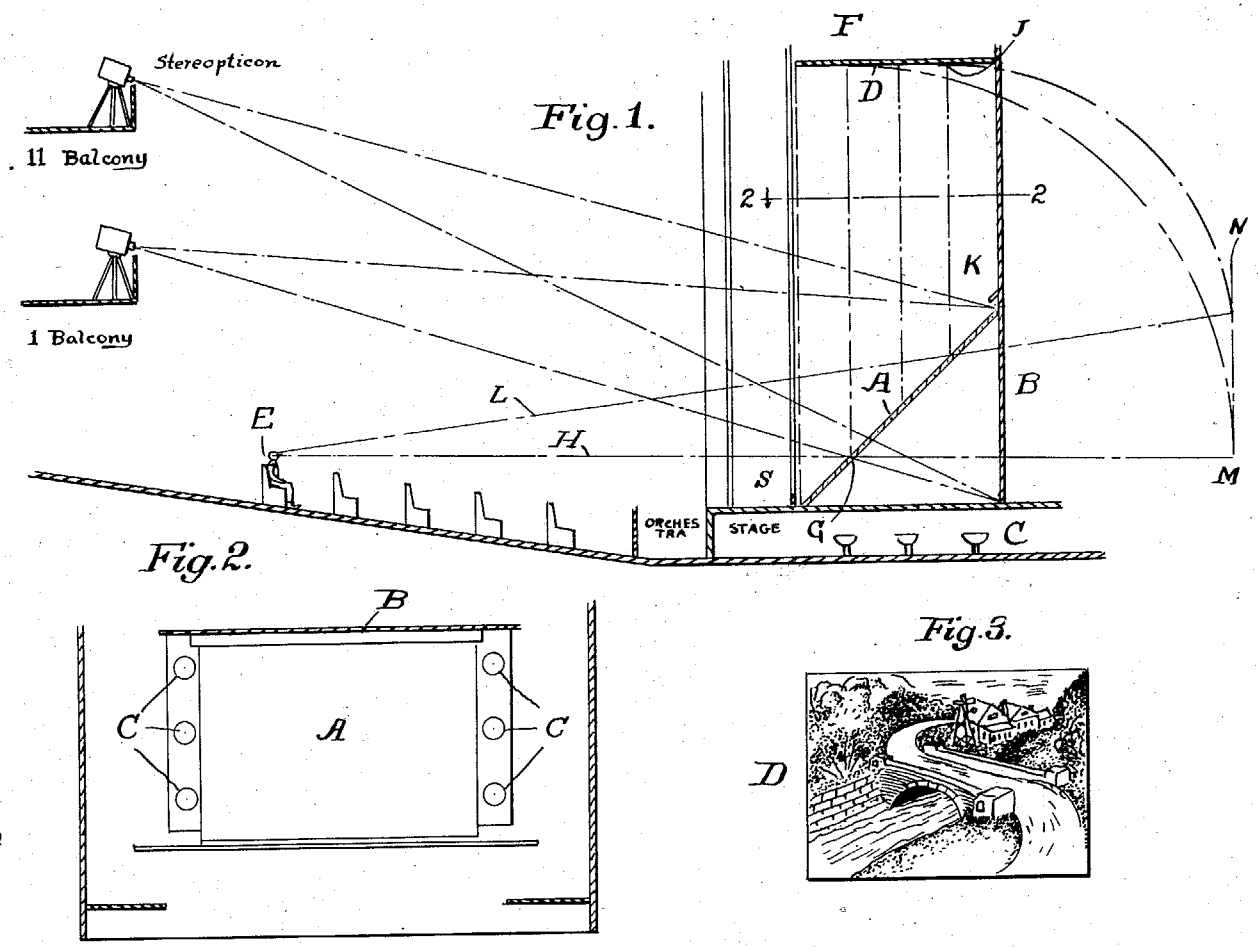
Inventor
Charles E. R. Schneider.
By his Attorney
Wm. H. Reid.

UNITED STATES PATENT OFFICE.

CHARLES E. R. SCHNEIDER, OF NEW YORK, N. Y.

APPARATUS FOR SHOWING PICTURES IN RELIEF.

14,980. Specification of Reissued Letters Patent. Reissued Nov. 9, 1920.

Original No. 1,124,665, dated January 12, 1915, Serial No. 865,214, filed October 5, 1914. Application for reissue filed July 29, 1920. Serial No. 399,919.

*To all whom it may concern:*

Be it known that I, CHARLES E. R. SCHNEIDER, a citizen of the United States of America, and resident of New York, in the county of New York and State of New York, have invented certain new and useful Improvements in Apparatus for Showing Pictures in Relief, of which the following is a full, clear, and exact description.

This invention relates to improvements in apparatus for the exhibition of pictures for amusement purposes, the object thereof being to acquire visual effects of great interest and attractiveness especially occasioned by imparting the aspect of bulk and reality to the projected image and the distance of such image relatively to the showing which is also made, apparently as a background, of a landscape or accessories.

The invention as carried out on a stage in a theater, playhouse, or hall comprises a transparent plate mounted at an inclination to the line of vision of the people in the audience, a screen behind the plate and a projecting machine or machines, such as a moving picture machine or a stereopticon, or both, to be alternately or simultaneously used for the projection of the moving or still pictures.

The apparatus, furthermore, includes a sheet such as canvas or other suitable material having scenery or accessories painted or depicted thereon, such sheet having its location opposite the glass plate, and by reason of being brightly illuminated is operable to cast the reflection of the landscape scenery or accessories onto the transparent plate.

The invention is described in conjunction with the accompanying drawings and is set forth in the claims.

In the drawings:—Figure 1 is a sectional elevation, more or less diagrammatical, showing the preferred combination and arrangement of parts for acquiring the desired visual and illusory effects. Fig. 2 is a plan view as seen below the line 2—2, Fig. 1. Fig. 3 is an inverted plan view of an overhead landscape bearing sheet.

As shown in the drawing, on a stage S is arranged a vertical screen B, such as is usually provided to receive the projection from a motion picture machine, or stereopticon, or other projecting apparatus, placed at the rear of the auditorium, such as on a balcony; whereby the images cast on the screen B will be visible to the audience, as indicated.

In front of the screen B is arranged an inclined plate A of suitable transparent material, such as glass. This plate A is shown as inclined rearwardly, at an angle of about 45 degrees to the screen B, and to the horizontal floor of the stage. This plate A is arranged to intercept the rays projected on the screen B by the projecting apparatus, but by the well known laws of optics, these rays will pass through the glass plate, and will be received on the screen B in the usual manner, and will be visible to the audience, the same as if the glass plate were omitted. The four edges of the glass plate are preferably obscured by wings or flies, and the intermediate portion of the glass plate will not be visible to the audience.

Opposite the glass plate A, I arrange a suitable image surface, shown in the present arrangement in the form of a sheet or plate D substantially horizontal, which is arranged vertically above the plate A. On the image surface D is applied a landscape or scenery of any desired form. A landscape, scenery or accessories is painted or otherwise produced on this surface D. It will be understood that if this scenery is illuminated, the reflecting plate A will cause the light rays from the scenery at the image surface D, to be projected forward horizontally and received by an observer in the audience, who is located at E. Special means are preferably provided to illuminate the scenery on the image surface D, and I show a set of lights C on each side, positioned a short distance below the stage floor, so that these lights will reflect upwardly and illuminate the image surface D, but will not impinge on the screen B. The light ray from a given point F on the image surface D, will strike a point G on the inclined plate A, and be reflected forward on a line or path H, to the observer at E. In like manner a light ray from a point J, on the image surface D, will strike a point K, on the reflecting surface A, and pass along a path L to the observer. It is well known that reflected rays appear to the observer in a continuation of their path from the reflector to the observer, and appear on an extension of such latter path, and as far beyond or back of the reflecting surface, as such ray travels from the image to the reflecting surface. From this it follows that the point F, will appear to the observer in the line or path H, at a point M, the same distance from the point G, as is the point F. Likewise the point J, will appear to the observer in the path L, at a point N, a distance removed from the point K equal to the distance from the point K to the point J. This applies to every point in the image, and therefore the scene on the image surface D will appear at a locus M—N. But this locus is beyond or to the rear of the screen B upon which the image is projected by the projecting apparatus. With this form of apparatus, the images, either a motion picture film, or still images, are depicted on the film or plate with no background, that is, the background is opaque on the image surface to be projected. With the motion picture film, the objects in motion will appear to be in motion at the place of the screen B. The scenery on the image surface at D will be projected at the same time into the eye of the observer at E, but for the reasons set forth, this scenery will appear to the observer to be located some distance to the rear of the screen B, at the locus M—N. This will give a plastic or stereoscopic effect, and will create a very strong and life-like illusion having the aspect of bulk or relief, similar to that produced by the instrument known as a stereoscope. The images in motion will actually appear as if moving some distance in front of the scenery.

For the reasons stated, it will be understood that the projection of the scenery or image surface from the sheet at D, will be apparently located at the locus M—N, and the distance that this image appears beyond the screen B, is determined by the distance that the image surface D is located above the reflecting plate A; it being understood that the screen B is much nearer to the plate A than is the image surface at D.

Having thus described my invention, what I claim is:—

1. In an apparatus of the character described, in combination, a transparent plate mounted at an incline to the line of vision of an observer, a screen behind the plate, and a projecting machine by which a picture is thrown through the transparent plate and onto the screen.

2. In an apparatus of the character described, in combination, a transparent plate mounted at an incline to the line of vision of an observer, a screen behind the plate, and a projecting machine by which a picture is thrown through the transparent plate and onto the screen, and a sheet having a landscape or accessories thereon arranged at an angle to the transparent plate and from which the picture thereon is thrown onto said plate.

3. The combination with a projecting apparatus, and a stage screen to receive the image projection, visible to an observer in front of the stage and screen, of a transparent reflecting plate located between the projection apparatus and the screen arranged inclined to the projection rays to permit passage of such rays to the screen without interference, and a sheet having scenery or accessories produced thereon and located at the stage beyond the said plate and arranged to be reflected by the plate to appear to the observer as coincident with said other image projected on the screen.

4. The combination with a projecting apparatus, and a stage screen to receive the image projection, visible to an observer in front of the stage and screen, of a transparent reflecting plate located between the projection apparatus and the screen arranged inclined to the projection rays to permit passage of such rays to the screen without interference, a sheet having scenery or accessories produced thereon and located at the stage beyond the said plate and arranged to be reflected by the plate to appear to the observer as coincident with said other image projected on the screen, and means for directing light upon said sheet without lighting the said inclined plate or the screen.

5. The combination with a projecting apparatus, and a stage screen to receive the image projection, visible to an observer in front of the stage and screen, of a transparent reflecting plate located between the projection apparatus and the screen arranged inclined to the projection rays to permit passage of such rays to the screen without interference, and a sheet having accessories or scenery produced thereon and for causing a second image to be received on the said inclined plate to be reflected to the observer so as to appear as coincident with said other image projected on the screen, but located at a different place from the other image.

6. The combination with a projecting apparatus, and a stage screen to receive the image projection, visible to an observer in front of the stage and screen, of a transparent reflecting plate located between the projection apparatus and the screen arranged inclined to the projection rays to permit passage of such rays to the screen without interference, and a sheet having scenery or accessories produced thereon and for causing a second image to be received on the said inclined plate to be reflected to the observer so as to appear as coincident with said other image projected on the screen, but located to the rear of the first image.

7. The combination with a projecting apparatus, and a stage screen to receive the image projection, visible to an observer in front of the stage and screen, of a transparent reflecting plate located between the projection apparatus and the screen arranged inclined to the projection rays to permit passage of such rays to the screen without interference, and a sheet having scenery or accessories produced thereon and located at the stage beyond the said inclined plate at a different distance from the plate than is said screen and arranged to be reflected by the plate to appear to the observer as coincident with said image projected on the screen, but located at a different place from the first image.

8. The combination with a projecting apparatus, and a stage screen to receive the image projection, visible to an observer in front of the stage and screen, of a transparent reflecting plate located between the projection apparatus and the screen arranged inclined to the projection rays to permit passage of such rays to the screen without interference, a sheet having scenery or accessories produced thereon and located at the stage beyond the said inclined plate at a greater distance removed from the plate than is said screen, to be reflected by the plate so as to appear to the observer as coincident with a said image projected on the screen but located to the rear of the first image.

CHARLES E. R. SCHNEIDER.